(12) United States Patent
Maeda

(10) Patent No.: US 7,810,619 B2
(45) Date of Patent: Oct. 12, 2010

(54) FLUID-PRESSURE SHOCK ABSORBER

(75) Inventor: Atsushi Maeda, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/320,507

(22) Filed: Jan. 28, 2009

(65) Prior Publication Data
US 2009/0194379 A1  Aug. 6, 2009

(30) Foreign Application Priority Data
Jan. 31, 2008  (JP)  ............................ 2008-021500
Dec. 25, 2008  (JP)  ............................ 2008-330336

(51) Int. Cl.
F16F 9/36  (2006.01)
(52) U.S. Cl. ................................. 188/322.17
(58) Field of Classification Search ................
188/322.16–322.17
See application file for complete search history.

(56) References Cited
U.S. PATENT DOCUMENTS 5,115,892 A * 5/1992 Yamaoka et al. .......... 188/282.5
5,224,573 A * 7/1993 Amemiya et al. ....... 188/322.17
5,533,598 A * 7/1996 Adrian et al. ........... 188/322.17
6,622,832 B2 * 9/2003 Ashiba et al. ........... 188/322.17
6,659,243 B2 * 12/2003 Yasuda ................... 188/322.17
2006/0219506 A1 * 10/2006 Zdeb ...................... 188/322.16

FOREIGN PATENT DOCUMENTS
JP    06-058358 A    3/1994
JP    2007-057088 A  3/2007

* cited by examiner

Primary Examiner—Christopher P. Schwartz
(74) Attorney, Agent, or Firm—Rader, Fishman & Grauer PLLC

(57) ABSTRACT

A fluid-pressure shock absorber comprising: an external cylinder with an open portion provided at one end thereof, a piston rod, a tip of which projects from the open portion of the external cylinder; a rod guide, wherein the open portion of the external cylinder is closed with caulking works so as to make a caulking portion, and further comprising: an annular bump cap coaxially arranged relative to the external cylinder; a cap holder arranged on a side of the tip of the piston rod relative to the rod guide so as to retain the bump cap, wherein an end portion on the rod guide side of the bump cap is abutted to the caulking portion, and a clearance in an axial direction is formed between an end portion of the cap holder on a side towards the tip of the piston rod and the bump cap.

8 Claims, 6 Drawing Sheets

FLUID-PRESSURE SHOCK ABSORBER

BACKGROUND OF THE INVENTION

1. Field of the Invention

The present invention relates to a fluid-pressure shock absorber, and more particularly to a fluid-pressure shock absorber provided with a bump cap.

2. Description of the Related Art

In a fluid-pressure shock absorber which is applied to a suspension device of a vehicle, there is, for example, a fluid-pressure shock absorber, where a bump cap is arranged at an open portion of an external cylinder thereof. (refer to, for example, Japanese Patent Application Laid-open No. 2007-57088). With a fluid-pressure shock absorber where a coil spring is coaxially arranged and an internal diameter of the coil spring is close to an external diameter D0 of an external cylinder, an external diameter D1 of the bump cap is limited to the external diameter D0 of the external cylinder or less ($D0 \leqq D1$). Here, in a certain fluid-pressure shock absorber, a small-diameter portion of an external diameter D2 ($D0 \geqq D1 > D2$) is formed at the open portion of the external cylinder, and the bump cap, its external diameter D1 of which is equal to or less than the external diameter D0 of the external cylinder, is pressed into the small-diameter portion. However, as regards a fluid-pressure shock absorber where its open portion of an external cylinder is closed by means of caulking treatments such as curling processes, some difficulties can be found when a small-diameter portion is formed at the open portion of the external cylinder. Moreover, in some cases it becomes impracticable to install certain parts such as a piston inside the absorber due to formation of the small-diameter portion. Accordingly, in the fluid-pressure shock absorber where the open portion of the external cylinder thereof is closed by means of the caulking treatments, there is a need for a structure for retaining a bump cap with an external diameter D1 not overly exceeding the external diameter D0 of the external cylinder.

SUMMARY OF THE INVENTION

The present invention has been made in light of the above problem, and it is an object of the present invention to provide a fluid-pressure shock absorber where, even though an open portion of an external cylinder thereof is caulked, an external diameter of a bump cap does not exceed an external diameter of the external cylinder in a conspicuous manner.

In order to achieve the object described above, according to a first aspect of the present invention, there is provided a fluid-pressure shock absorber comprising: an external cylinder with an open portion provided at one end thereof; a piston rod, a tip of which projects from the open portion of the external cylinder so that the tip is placed outside the external cylinder; a rod guide arranged at the open portion of the external cylinder, wherein the open portion of the external cylinder is closed by applying caulking work to the open portion of the external cylinder so as to make a caulking portion, and further comprising: an annular bump cap coaxially arranged relative to the external cylinder; a cap holder arranged on a side of the tip of the piston rod relative to the rod guide so as to retain the bump cap, wherein an end portion on the rod guide side of the bump cap is abutted to the caulking portion, and a clearance in an axial direction is formed between an end portion of the cap holder on a side towards the tip of the piston rod and the bump cap.

According to a second aspect of the present invention, there is provided a fluid-pressure shock absorber comprising: an external cylinder with an open portion provided at one end thereof; a piston rod, a tip of which projects the open portion of the external cylinder so that the tip is placed outside the external cylinder; a rod guide arranged at the open portion of the external cylinder, wherein the open portion of the external cylinder is closed by applying caulking works to the open portion of the external cylinder so as to make a caulking portion, and further comprising: a bump cap with a barrel portion and a base portion, the bump cap coaxially arranged relative to the external cylinder; and a cap holder retaining the bump cap, wherein the cap holder comprises: a caulking receiving portion extending in a radial direction; and a retention portion extending in an axial direction and restricting relative displacement of the bump cap in the axial direction, and the barrel portion of the bump cap is abutted to one end of the external cylinder, so that a clearance in an axial direction is formed between an end portion of the cap holder on a side towards the tip of the piston rod and the base portion of the bump cap.

In the present invention, it will be feasible to provide a fluid-pressure shock absorber where, even though an open portion of an external cylinder thereof is caulked, an external diameter of a bump cap does not exceed an external diameter of the external cylinder in a conspicuous manner.

DETAILED DESCRIPTION OF THE PREFERRED EMBODIMENTS

In the following embodiments of the present invention, structural improvements suitable for merchandises are provided. One of the main embodiments is, as discussed above, that even though the open portion of the external cylinder of the fluid-pressure shock absorber is caulked, the external diameter of the bump cap does not exceed the external diameter of the external cylinder in a conspicuous manner. But, the embodiments of the present invention are not limited to this; the present invention further provides embodiments where enable to solve other variant problems. For example, Japanese Patent Application Laid-open No. H06-58358 discloses a fluid-pressure shock absorber where showing a fixed structure between an open portion of an external cylinder and a bump cap. In the disclosure an upper cap is fixed to an inner periphery side of the open portion of the external cylinder by means of welding, and the bump cap is fixed to the upper cap by press-fit. However, in a case where the open portion of the external cylinder is worked by means of caulking treatments such as curling processes, it becomes difficult to fix the upper cap to the inner periphery side of the external cylinder. Still further, consideration for escaping bump loads into the external cylinder needs to be discussed. In case that the bump loads can not be escaped into the external cylinder, all of the bump loads may be loaded over inner functional parts such as a bottom valve 6 or an inner tube 7 of the fluid-pressure shock absorber. In this case major structural modification has to be considered. In embodiments of the present invention, even though an open portion of an external cylinder is required to be closed by means of caulking treatments, it is possible to enlarge an external diameter D0 of the external cylinder and to be provided with a bump cap escaping bump loads into the external cylinder. The detail of the present invention is hereinafter explained.

A first embodiment of the present invention is explained with reference to FIGS. 1 to 4. In a fluid-pressure shock absorber 1 of the first embodiment is categorized into a twin tube damper (or a twin tube shock absorber) of a suspension device where arranged between wheels and a body of a vehicle.

Figure 1:
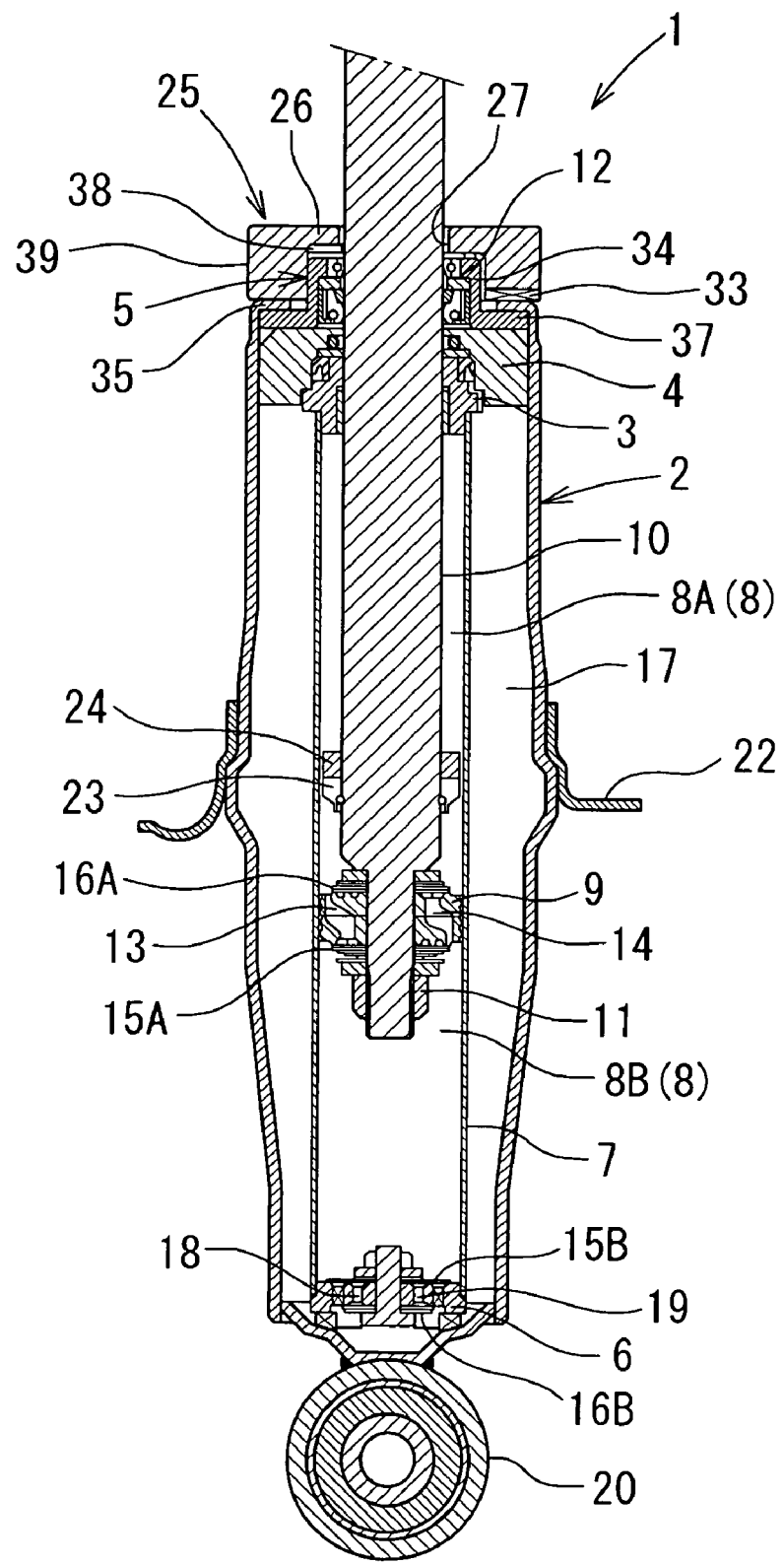
FIG. 1 is a cross-sectional view where a fluid-pressure shock absorber is cut in an axial direction according to a first embodiment of the present invention.

As shown in FIG. 1, in a fluid-pressure shock absorber 1 according to a first embodiment of the present invention, a piston 9 is slidably inserted inside an inner tube 7 where oil liquid (a sort of fluid) is filled in. In the inner tube 7, the interior of an oil chamber 8 is divided into a cylinder upper chamber 8A and a cylinder lower chamber 8B with the piston 9. The piston 9 is fixed to a bottom end portion (bottom side in FIG. 1) of a piston rod 10 with a nut 11. The piston rod 10 has a tip portion (top side in FIG. 1) where inserted into a rod guide 3, a seal case 4, and a seal 12 stored in a cap holder 5 in such a manner as to be slidable, air-tight, and liquid-tight. Note that since the rod guide 3 and the seal case 4 may be made as a one-piece unit, these two together constitute a "rod guide" within the context of this embodiment. The rod guide 3, the seal case 4 and the seal 12 are mounted on an end portion of the inner tube 7. The tip portion of the piston rod 10 is then extended outside the inner tube 7 and an external cylinder 2. Further, the cylinder lower chamber 8B is connected to a reservoir chamber 17 via a bottom valve 6. The interior of the reservoir chamber 17 is filled with oil liquid and gas.

The seal 12 as a sealing means, formed into a tubed shape, has an inner periphery where sealing the piston rod 10, and an outer periphery where sealing the cap holder 5 so as to close one end side of the external cylinder 2.

The piston 9 comprises a first elongation passage 13 and a first contraction passage 14 so as to connect the cylinder upper chamber 8A and the cylinder lower chamber 8B. At a bottom end surface of the piston 9 (bottom side in FIG. 1), a first elongation-side damping force generator 15A is provided so as to control oil liquid flow of the first elongation passage 13. On the other hand, at an upper end surface of the piston 9 (upper side in FIG. 1), a first contraction-side damping force generator 16A is provided so as to control oil liquid flow of the first contraction passage 14. Here, the first elongation-side damping force generator 15A and the first contraction-side damping force generator 16A are both composed of an orifice and a disc valve group (such as disc, open-mouth disc or notched disc).

The bottom valve 6 comprises a second elongation passage 18 and a second contraction passage 19 so as to connect the cylinder lower chamber 8B and the reservoir chamber 17. Further, the bottom valve 6 comprises: as the same with the piston 9, a second elongation-side damping force generator 15B at the second elongation passage 18; and a second contraction-side damping force generator 16B at the second contraction passage 19, both controlling oil liquid flow. Further, as the same with the first elongation-side damping force generator 15A and the first contraction-side damping force generator 16A, the second elongation-side damping force generator 15B and the second contraction-side damping force generator 16B are also both composed of the orifice and the disc valve group (disc, open-mouth disc, cutout disc, etc.).

In the fluid-pressure shock absorber as discussed above, an elongation stroke of the piston rod 10 can be defined as follows. Oil liquid of the reservoir chamber 17 flows toward the cylinder lower chamber 8B through the second elongation passage 18 while oil liquid of the cylinder upper chamber 8A flows toward the cylinder lower chamber 8B through the first elongation passage 13. Accordingly, the first elongation-side damping force generator 15A and the second elongation-side damping force generator 15B both generate damping forces on an elongation side. On the other hand, in a contraction stroke of the piston rod 10, oil liquid of the cylinder lower chamber 8B flows toward the reservoir chamber 17 through the second contraction passage 19 while oil liquid of the cylinder lower chamber 8B flows toward the cylinder upper chamber 8A through the first contraction passage 14. Accordingly, the first contraction-side damping force generator 16A and the second contraction-side damping force generator 16B both generate damping forces on a contraction side. Here, excess or short of oil liquid of the oil chamber 8 caused by volume variation in the oil chamber 8 due to approach or withdrawal of the piston rod 10 relative to the oil chamber 8 can be compensated by giving or taking oil liquid between the reservoir chamber 17 and the oil chamber 8 (especially the cylinder lower chamber 8B).

At a bottom portion of the external cylinder 2 (an end potion placed opposite to the open portion) in the fluid-pressure shock absorber 1 is provided with an attaching eye 20 (attaching portion on a wheel side) so as to connect a control arm. A tip of the piston rod 10 is provided with a connecting portion (not shown in FIGs) so as to connect with a vehicle body. On this connection portion side, a bump rubber (not shown in FIGs), made of resin such as urethane, rubber, etc. where having elasticity, is provided. This bump rubber can absorb impact, which occurred when the piston rod 10 contracts, by collision with a bump cap 25. The bump rubber may be fixed to the fluid-pressure shock absorber 1 or to a vehicle side to which the fluid-pressure shock absorber 1 is installed. On an external surface of the external cylinder 2, a spring sheet 22 is provided so as to receive a suspension spring. On a basal end side of the piston rod 10 (bottom side in FIG. 1), more specifically, on the basal end side but not crossing the piston 9, a rebound stopper 23 and a cushion 24 are provided. Further, the fluid-pressure shock absorber 1 yet has the bump cap 25 right on the open portion (top end portion in FIG. 1 where including a curl portion 35 later explained) of the external cylinder 2.

Figure 2:
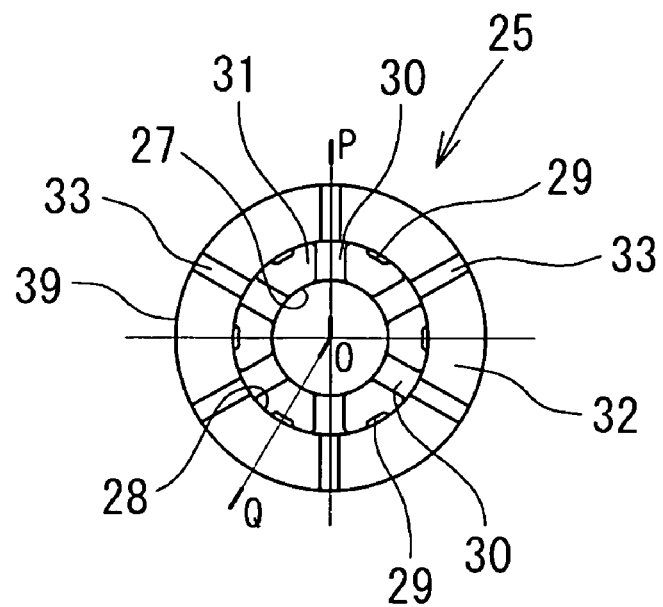
FIG. 2 is a plan view of a bump cap according to a first embodiment of the present invention.
Figure 3:
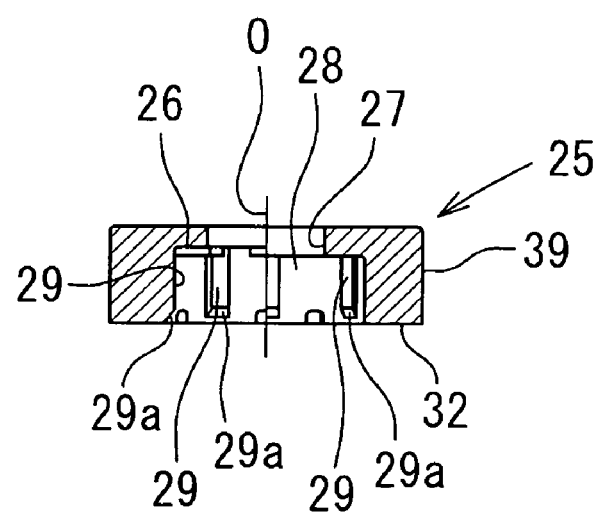
FIG. 3 is a view taken along the line P-O-Q in FIG. 2.

As shown in FIG. 3, the bump cap 25 is a cylindrical-shaped part with a closed-end where made of synthetic resin, and has a base portion 26 where provided with a rod insertion hole 27 for insertion of the piston rod 10. The bump cap 25 has an inner diameter portion 28 where a plurality of first ribs 29 (6 ribs in the first embodiment) extending in an axial direction (in a vertical direction in FIG. 3) are arranged at regular intervals around a shaft 0, that is, at intervals of 60°. Each of the first ribs 29 has a one end portion (top side in FIG. 3) that touches the base portion 26, and also has the other end portion (bottom side in FIG. 3) where provided with a slanting surface 29a formed as that height of the other end portion relative to the inner diameter portion 28 is gradually decreased as moving toward a side surface 32 (end portion of the rod guide 3 side). Further, as shown in FIG. 2, on a bottom surface 31 of the bump cap 25 (inner side surface of the base portion 26), a plurality of second ribs 30 (6 ribs in the first embodiment) where extending in a radial direction from the rod insertion hole 27 are equally arranged at intervals of 60° around the shaft 0. Moreover, on the side surface 32 of the bump cap 25, a plurality of grooves 33 (6 grooves in the first embodiment) where extending in a radial direction from peripheral of opening of the inner diameter portion 28 to an outer diameter portion 39 are equally arranged at intervals of 60° around the shaft 0. A circular area, the width of which is defined between the inner diameter portion 28 and the outer diameter portion 39 hereinafter described, corresponds to a barrel portion in the present invention.

Figure 4:
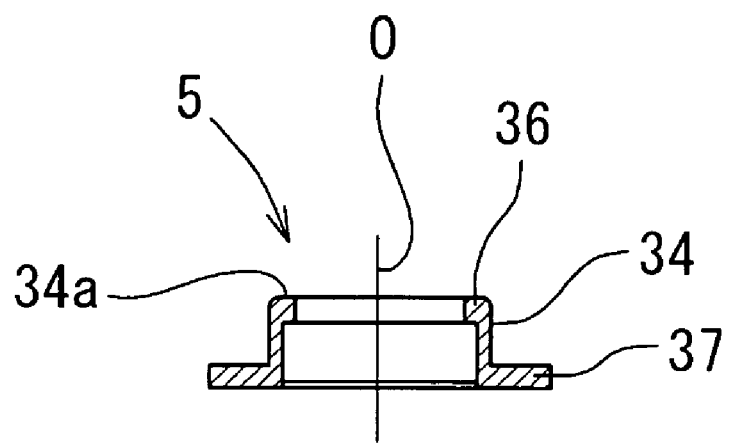
FIG. 4 is a cross-sectional view where a cap holder is cut in an axial direction according to a first embodiment of the present invention.

As shown in FIG. 4, the cap holder 5 comprises: a retention portion 34 cylindrically shaped; an inner flange portion 36 formed at an upper end peripheral of the retention portion 34 (top side in FIG. 4); and an outer flange portion 37 formed at a bottom end peripheral of the retention portion 34 (bottom side in FIG. 4). As shown in FIG. 1, the cap holder 5 is arranged right above the seal case 4 and coaxially placed relative to the piston rod 10. By conducting curl works (caulking works) to the open portion (top side in FIG. 1) of the external cylinder 2 so as to form a flat curl portion 35 (a caulking portion), which is an inner flange portion, the outer flange portion 37 of the cap holder 5 is clamped between the curl portion 35 and the seal case 4. With this architecture, the cap holder 5 can be fixed to the open portion of the external cylinder 2 in a state where the retention portion 34 of the cap holder 5 is projected outward the external cylinder 2. Here, the seal 12 is retained with the inner flange portion 36 of the cap holder 5. The retention portion 34 corresponds to a bump cap press-fit portion to which the bump cap 25 is press-fitted, and the outer flange portion 37 corresponds to a caulking receiving portion.

In the fluid-pressure shock absorber, the inner diameter portion 28 of the bump cap 25 is press-fitted into the outer diameter portion (external cylindrical surface) of the retention portion 34 of the cap holder 5, whereby each of the first ribs 29 of the inner diameter portion 28 of the bump cap 25 is compressed in a radius direction with the outer diameter portion (external cylindrical surface) of the retention portion 34 of the cap holder 5. With this architecture, connecting force between the bump cap 25 and the cap holder 5 is generated, that is, restricting relative displacement of the bump cap 25 and the cap holder 5 both in an axial direction and in a circumferential direction. The bump cap 25 is thus retained as not being relatively displaced due to presence of the cap holder 5. Here, in case where the bump cap 25 is approached toward the end portion of the cap holder 5, each of the slanting surfaces 29a where placed at a bottom end portion of each of the first ribs 29 of the bump cap 25 is abutted to the end portion of the retention portion 34 of the cap holder 5, whereby the bump cap 25 is centered relative to the cap holder 5.

As shown in FIG. 1, in the fluid-pressure shock absorber 1, when the press-fitting of the bump cap 25 to the cap holder 5 is completed, that is, when the side surface 32 of the bump cap 25 is abutted to the external surface of the curl portion 35 of the external cylinder 2, clearance 38, having a predetermined distance in an axial direction (in a vertical direction in FIG. 1), is formed between an upper end surface 34a of the retention portion 34 of the cap holder 5 (see FIG. 4) and the bottom surface 31 of the bump cap 25.

In the first embodiment, by clamping the outer flange portion 37 (flange portion) between the seal case 4 and the curl portion 35 (caulking portion) of the external cylinder 2, the cap holder 5 is retained at the open portion of the external cylinder 2 in a state where the retention portion 34 is projected outward the external cylinder 2. With this architecture, the outer flange portion 37 extending in a radial direction is formed as the caulking receiving portion. The inner diameter portion 28 of the bump cap 25 is then pressed-fitted into the outer diameter portion (external cylindrical surface) of the retention portion 34 of the cap holder 5, whereby the side surface 32 (end portion on the rod guide 3 side) of the bump cap 25 is adapted to meet the curl portion 35 formed on the open portion of the external cylinder 2. Accordingly, even though, in the fluid-pressure shock absorber 1, the open portion of the external cylinder 2 is closed by means of curl works (or caulking works), the bump cap 25, having the outer diameter portion 39 which is equal to or less than the outer diameter of the external cylinder 2, can be arranged (or retained) on the open portion of the external cylinder 2.

As disclosed in Japanese Patent Application Laid-open No. H06-58358 hereinbefore discussed, if the upper cap and the external cylinder are fixed by means of welding, it is possible to escape the bump loads from the bump cap to the upper cap, and then to the external cylinder. However, in the present invention, since the cap holder is not fixed in an axial direction, it was necessary to consider some methods to escape the bump loads to the external cylinder.

According to the first embodiment, in a state where the side surface 32 of the bump cap 25 is abutted to the curl portion 35 of the external cylinder 2, the clearance 38 in an axial direction is formed between the upper end surface 34a of the retention holder 34 of the cap holder 5 and the bottom surface 31 of the bump cap 25. With this architecture, even if relatively large bump loads are applied onto the bump cap 25, the inner functional parts of the fluid-pressure shock absorber 1 can be protected by escaping the bump load to the external cylinder 2. Further, by arranging the second ribs 30 on the inner side surface (the bottom surface 31) of the base portion 26 of the bump cap 25, rigidity of the bump cap 25 itself can be ensured.

Still further, in the first embodiment, by press-fitting the bump cap 25 into the cap holder 5, each of the first ribs 29 arranged on the inner diameter portion 28 of the bump cap 25 is compressed in a radius direction by the outer diameter portion (external cylindrical surface) of the retention portion 34 of the cap holder 5. With this architecture, connecting force between the bump cap 25 and the cap holder 5 is generated, restricting relative displacement of the bump cap 25 and the cap holder 5 both in an axial direction and in a circumferential direction. The bump cap 25 can be thus retained as not being relatively displaced due to presence of the cap holder 5.

Furthermore, in the first embodiment, when the bump cap 25 is press-fitted into the cap holder 5, the bump cap 25 is approached to the cap holder 5, whereby the wedge-like slanting surface 29a formed at the bottom end portion of each of the first ribs 29 of the bump cap 25 is abutted to the end portion of the retention portion 34 of the cap holder 5. With this architecture, the bump cap 25 is centered relative to the cap holder 5 contributing to easy press-fit of the bump cap 25 to the cap holder 5.

Still furthermore, in the first embodiment, on the side surface 32 of the bump cap 25 (end portion of the rod guide 3 side), the plurality of grooves 33 are formed so as to connect the inner diameter portion 28 and the outer diameter portion 39. Accordingly, it makes possible to discharge any substance entered into the interior of the bump cap 25, such as rainwater or dust, outside the bump cap 25 by means of the grooves 33.

Hereinabove, the first embodiment has been discussed in connection with the fluid-pressure shock absorber with the caulked open portion of the external cylinder. In the first embodiment, the bump load applied to the bump cap is escaped to the external cylinder, and the diameter of the external cylinder is set as the largest relative to any other parts hereinabove explained. However, the first embodiment of the present invention is not limited thereto, but, for example, it may be fabricated as that the diameter of the bump cap is set to be larger than the one of the external cylinder.

Next, a second embodiment of the present invention will be described with reference to FIGS. 5 to 7. Here, any components identical with or corresponding to those of the aforementioned first embodiment are denoted by the same reference numerals, and a detailed description thereof will be omitted below. In the second embodiment, only architecture of a bump cap 41 will be different from the first embodiment (that is, the bump cap 25).

Figure 7:
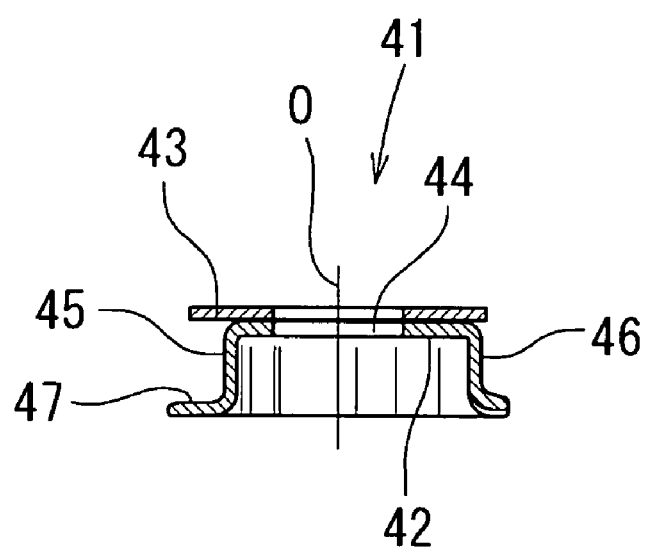
FIG. 7 is a view taken along the line P-O-Q in FIG. 6.

As shown in FIG. 7, the bump cap 41 is fabricated as that a plate 43 receiving a mount rubber (not shown) is bonded (for example, by means of weld) on a bottom portion 42 of press moldings where formed into a cylindrical shape with a closed-end. A rod insertion hole 44 into which the piston rod 10 is inserted is formed on the bottom portion 42 and the plate 43.

Figure 6:
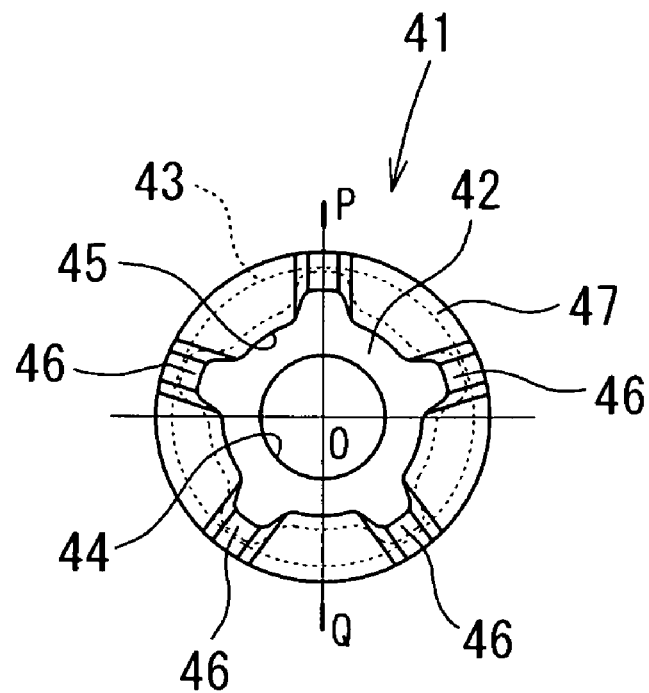
FIG. 6 is a plan view of a bump cap according to a second embodiment of the present invention.

As shown in FIG. 6, at a cylindrical portion 45 of the bump cap 41, a plurality of a third ribs 46 (5 ribs in the second embodiment) extending in an axial direction (in a vertical direction in FIG. 7) are equally arranged at intervals of 60° around a shaft 0, whereby the cylindrical portion 45 is formed into a petaline shape in section of rotation. Further, the bump cap 41 is provided with a flange portion 47 at a bottom end circumference of the cylindrical portion 45. Each of the third ribs 46 is extended on the cylindrical portion 45 in an axial direction, and curved at boundary between the cylindrical portion 45 and the flange portion 47. The flange portion 47 is extended into a radial direction.

Figure 5:
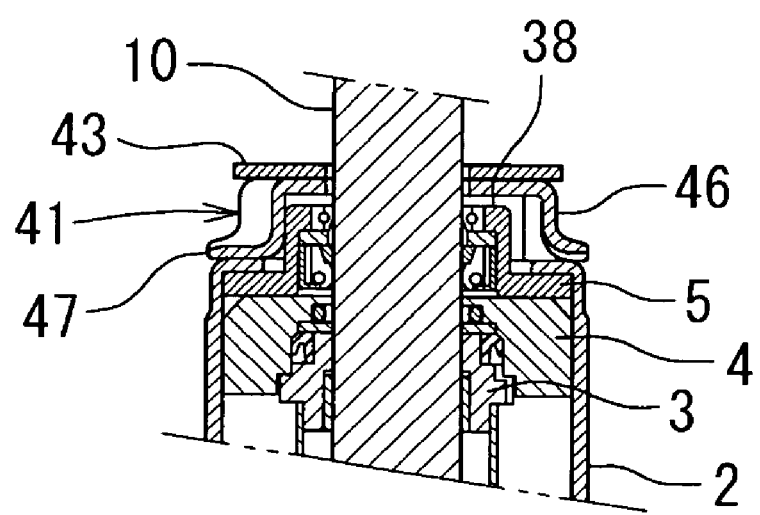
FIG. 5 is a main cross-sectional view where a fluid-pressure shock absorber is cut in an axial direction according to a second embodiment of the present invention.

As shown in FIG. 5, according to the second embodiment, by press-fitting the bump cap 41 into the retention portion 34 of the cap holder 5 (see FIG. 4) as covering the retention portion 34, connection force is generated between the cylindrical portion 45 of the bump cap 41 and the retention portion 34 of the cap holder 5. This connection force will work to restrict relative displacement of the bump cap 41 and the cap holder 5 in an axial direction and in a circumferential direction. Accordingly, the bump cap 41 is retained as not being relatively displaced due to presence of the cap holder 5. Still further, according to the second embodiment, when the bump cap 41 is approached to the end portion of the cap holder 5, an R configuration formed between the cylindrical portion 45 of the bump cap 41 and the flange portion 47 will be abutted against the end portion of the cap holder 5. The retention portion 34 of the cap holder 5 is then guided to the interior of the cylindrical portion 45 of the bump cap 41.

Still further, as also shown in FIG. 5, according to the second embodiment, when the press-fit of the bump cap 41 into the cap holder 5 is completed by abutting the flange portion 47 of the bump cap 41 against the outer surface of the curl portion 35 of the external cylinder 2, the clearance 38 having a predetermined interval in an axial direction (in a vertical direction in FIG. 5) is provided between the upper end surface 34a of the retention portion 34 of the cap holder 5 (see FIG. 4) and the bottom portion 42 of the bump cap 41.

In the second embodiment, effects identical with the first embodiment hereinabove described can be obtained. In addition thereto, it makes possible to discharge any substance entered into the interior of the bump cap 41, such as rainwater or dust, outside the bump cap 41 by means of each of the third ribs 46 formed on the flange portion 47.

Next, a third embodiment of the present invention will be described with reference to FIGS. 8 to 10. As the same with the second embodiment, any components identical with or corresponding to those of the aforementioned first embodiment are denoted by the same reference numerals, and a detailed description thereof will be omitted below.

Figure 9:
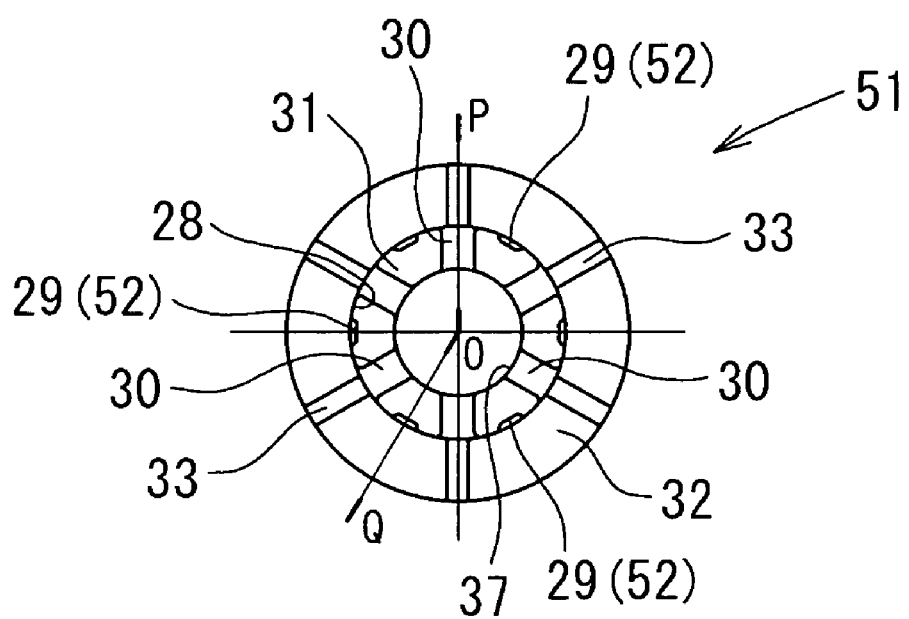
FIG. 9 is a plan view of a bump cap according to a third embodiment of the present invention.
Figure 10:
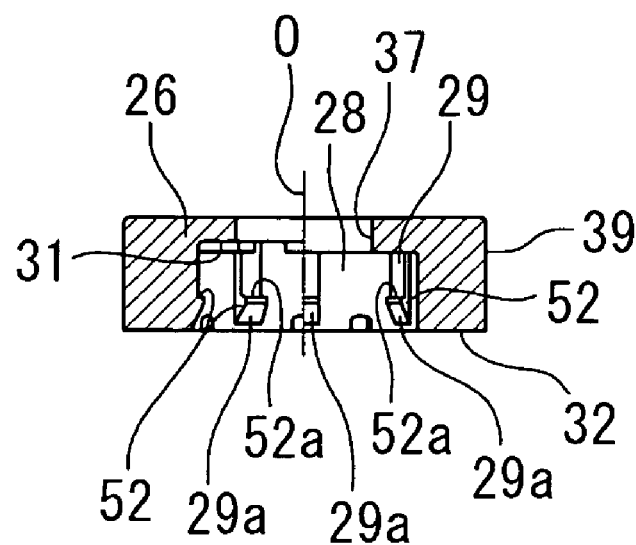
FIG. 10 is a view taken along the line P-O-Q in FIG. 9.

As shown in FIGS. 9 and 10, a bump cap 51 is provided with a hook-shaped engaging portion 52 having an engaging surface 52a at the bottom end portion of each of the first ribs 29. Each of the engaging portions 52 is formed as that the slanting surface 29a of each of the first ribs 29 is extended in a direction to come closer toward the shaft 0, and edges of both the slanting surface 29a and the engaging surface 52a are chamfered to arrange an acute angle.

Figure 8:
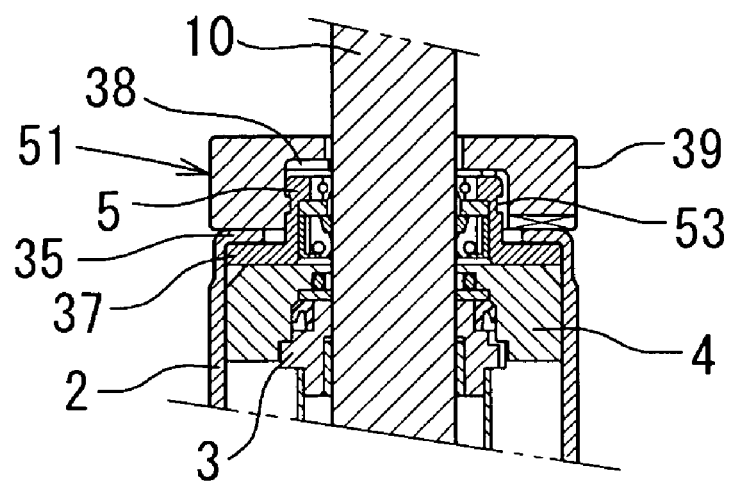
FIG. 8 is a main cross-sectional view where a fluid-pressure shock absorber is cut in an axial direction according to a third embodiment of the present invention.

In the third embodiment, as shown in FIG. 8, the inner diameter portion 28 of the bump cap 51 is press-fitted into the outer diameter portion (external cylindrical surface) of the retention portion 34 of the cap holder 5, whereby each of the first ribs 29 of the inner diameter portion 28 of the bump cap 51 is compressed in a radius direction by means of the outer diameter portion (external cylindrical surface) of the retention portion 34 of the cap holder 5. Accordingly, connection force is generated between the bump cap 51 and the cap holder 5. This connection force will work to restrict relative displacement of the bump cap 51 and the cap holder 5 in an axial direction and in a circumferential direction. The bump cap 51 is thus retained as not being relatively displaced due to presence of the cap holder 5. Here, in the third embodiment, in a state where the side surface 32 of the bump cap 51 is abutted against the external surface of the curl portion 35 of the external cylinder 2, each of the engaging portions 52 (engaging means) of each of the first ribs 29 of the bump cap 51 is adapted to engage an annular engaging groove 53 (engaging means) formed at the outer periphery surface of the retention portion 34 of the cap holder 5. The engaging portions 52 and the engaging grooves 53 are structured to be reciprocally engaged in a convexo-concave relation. Here, it is not important which member has convexity or concavity; grooves may be provided on the bump cap 51 and convexes may be provided on the cap holder 5, introducing a reverse convexo-concave relation in connection with the embodiments discussed hereinabove.

Moreover, in the third embodiment as the same with the first embodiment, in a state where the side surface 32 of the bump cap 51 is abutted to the external surface of the curl portion 35 of the external cylinder 2, the clearance 38 having a predetermined interval in an axial direction (in a vertical direction in FIG. 5) is formed between the upper end surface 34a of the retention holder 34 of the cap holder 5 and the bottom surface 31 of the bump cap 51.

Still further, in the third embodiment, effects identical with the first embodiment as discussed above can be obtained. In addition thereto, for example, even if length of each of the first ribs 29 of the bump cap 51 is restricted in an axial direction, and compression of each of the first ribs 29 only does not ensure predetermined extraction loads, the predetermined extraction loads will be ensured by engaging each of the engaging portions 52 (engaging means) of the bump cap 51 with the engaging grooves 53 (engaging means) of the cap holder 5.

Here, due to presence of the engaging portion between the bump cap 51 and the cap holder 5, the bump loads applied to the bump cap 51 may influence the inner functional parts through the cap holder 5. However, the resin-made bump cap 51 is a small piece of the engaging portion which is deformable, whereby a major part of force (generated by the bump load) will be received by the end portion of the external cylinder 2.

Furthermore, according to the third embodiment, holding power where the bump cap 51 is press-fitted into the cap holder 5 is exemplified as engagement of each of the engaging portions 52 (engaging means) of the bump cap 51 with the engaging groove 53 (engaging means) of the cap holder 5. With this architecture, the predetermined extraction loads can be ensured. However, if the extraction loads can be ensured with the holding power where engaging each of the engaging portions 52 (engaging means) of the bump cap 51 with the engaging groove 53 (engaging means) of the cap holder 5, it is not necessary for the bump cap 51 to be press-fitted into the cap holder 5.

Figure 11:
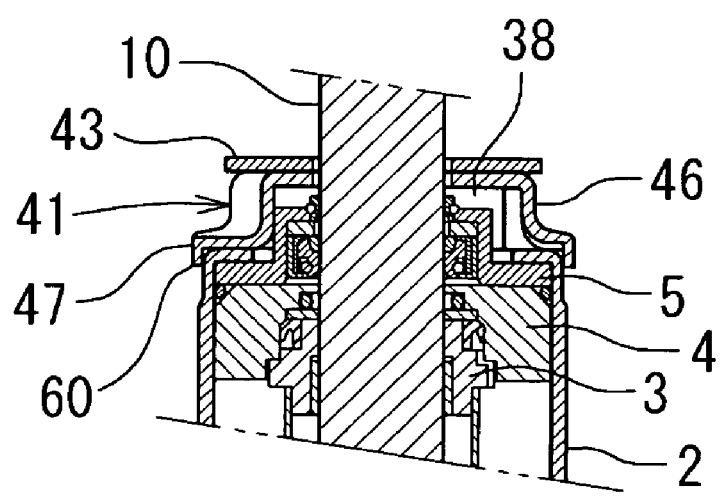
FIG. 11 is a main cross sectional view where a fluid-pressure shock absorber is cut in an axial direction according to a fourth embodiment of the present invention.

Next, a fourth embodiment of the present invention will be discussed with reference to FIG. 11. Here, as the same with the first and the second embodiments, any components identical with or corresponding to those of the aforementioned embodiments are denoted by the same reference numerals, and a detailed description thereof will be omitted below.

In the fourth embodiment, contrary to the second embodiment, the outer periphery of the flange portion 47 is additionally provided with a cylindrical extended portion 60 where bended in the axial direction of the external cylinder 2. This extended portion 60 can prevent dust, etc. where entering from the flange portion 47 to the place defined between the bump cap 41 and the cap holder 5.

Here, each of the embodiments hereinabove discussed is not limited thereto but can be fabricated, for example, as follows.

In those embodiments, the twin tube fluid-pressure shock absorbers are discussed; however, for example, single tube fluid-pressure shock absorbers, self-pump fluid-pressure shock absorbers or any other arbitrary fluid-pressure shock absorbers may be applicable in addition to the embodiments hereinabove discussed.

Furthermore, in the embodiments, the bump cap is formed into an annular shape; however, a polygonal circular shape is adaptable. If the cap holder has sealing structures, the bump cap may be formed into a C-shape.

Here, in each of the above embodiments discussed hereinabove, the curl portion where all curling one end side of the external cylinder thus forming the caulking portion is exemplified; however, the embodiments are not limited thereto. The caulking portion may be partial, that is, caulking one side of the external cylinder toward the inner diameter thereof, not all-round, but some specific portions only. In this case, the bump cap is adapted to abut on the portions where not caulked.

What is claimed is:

1. A fluid-pressure shock absorber comprising:
   an external cylinder with an open portion provided at one end thereof;
   a piston rod, a tip of which projects from the open portion of the external cylinder so that the tip is placed outside the external cylinder;
   a rod guide arranged at the open portion of the external cylinder,
   wherein the open portion of the external cylinder is closed by applying caulking works to the open portion of the external cylinder so as to make a caulking portion, the caulking portion being formed such that the open portion of the external cylinder is caulked approximately in a perpendicular direction and in a radial direction, forming a flat curl portion; and the fluid-pressure shock absorber further comprising:
   a cap holder retaining a bump cap; and
   the bump cap comprising a barrel portion and a base portion, the barrel portion extending from the base portion to the open portion of the external cylinder, and further comprising an annular side surface provided on a side of the open portion and abuts to the flat curl portion, the bump cap coaxially arranged relative to the external cylinder, wherein the cap holder comprises:
   a caulking receiving portion extending in a radial direction; and
   a retention portion extending in an axial direction and restricting relative displacement of the bump cap in the axial direction, the retention portion being cylindrically formed and having an outer diameter portion into which an inner diameter portion of the barrel portion of the bump cap is press-fitted, and,
   the barrel portion of the bump cap is abutted to one end of the external cylinder, so that a clearance in an axial direction is formed between an end portion of the cap holder on a side towards the tip of the piston rod and the base portion of the bump cap.

2. The fluid-pressure shock absorber according to claim 1, wherein the cap holder includes a flange portion formed at an end portion of the retention portion on the rod guide side, and clamped between the flat curl portion of the external cylinder and the rod guide.

3. The fluid-pressure shock absorber according to claim 2, wherein an engaging portion is provided, the engaging portion restricting relative displacement of the bump cap and the cap holder in an axial direction by reciprocally engaging the bump cap and the cap holder.

4. The fluid-pressure shock absorber according to claim 1, wherein the bump cap is formed into a cylindrical shape having a diameter equal to or less than a diameter of the external cylinder.

5. The fluid-pressure shock absorber according to claim 1, wherein an engaging portion with which the bump cap and the cap holder are reciprocally engaged by ridge and groove is provided so as to restrict relative displacement of the bump cap and the cap holder in an axial direction.

6. The fluid-pressure shock absorber according to claim 1, wherein an engaging portion is provided, the engaging portion restricting relative displacement of the bump cap and the cap holder in an axial direction by reciprocally engaging the bump cap and the cap holder.

7. The fluid-pressure shock absorber according to claim 1, wherein the other end side of the retention portion of the cap holder is formed with an inner flange portion that inwardly extends in a radial direction, and an annular seal that slidably contacts to the piston rod is retained on an inner periphery side of the retention portion.

8. The fluid-pressure shock absorber according to claim 1, wherein the annular side surface of the bump cap is an outer flange portion that is formed at a circumference of one end portion of the barrel portion of the bump cap, the outer flange portion outwardly extending in a radial direction.

* * * * *